(No Model.)  2 Sheets—Sheet 1.
A. H. DEAN & S. H. WHITING.
RECORDING INSTRUMENT FOR FIRE ALARM SIGNALS.
No. 268,876.  Patented Dec. 12, 1882.
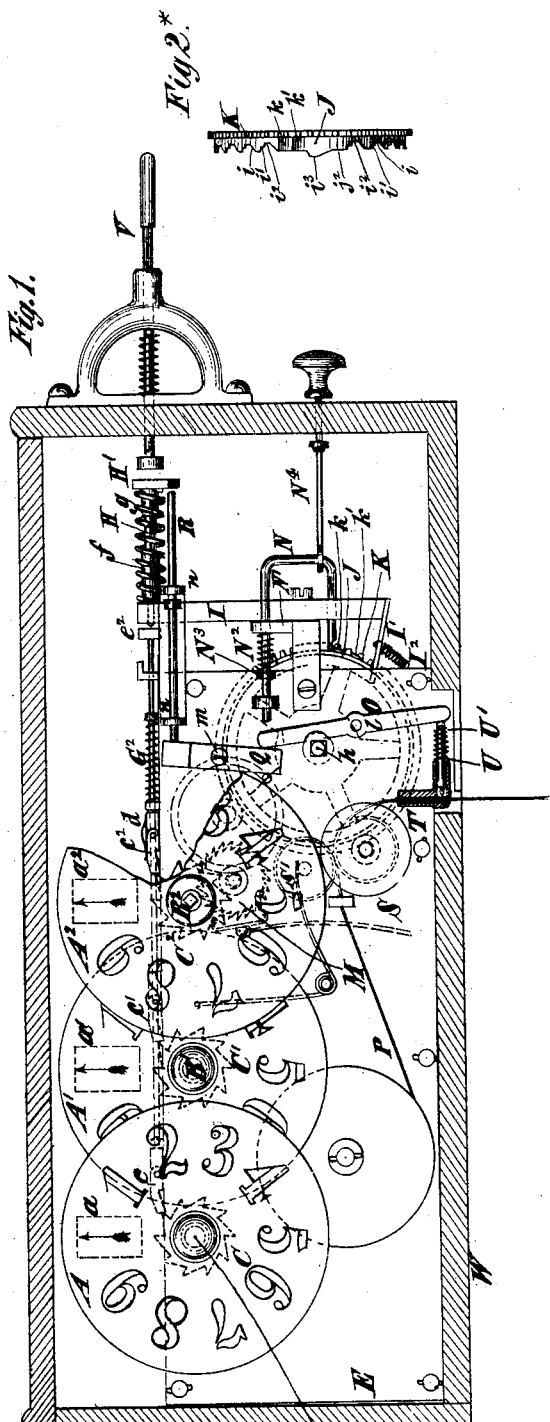
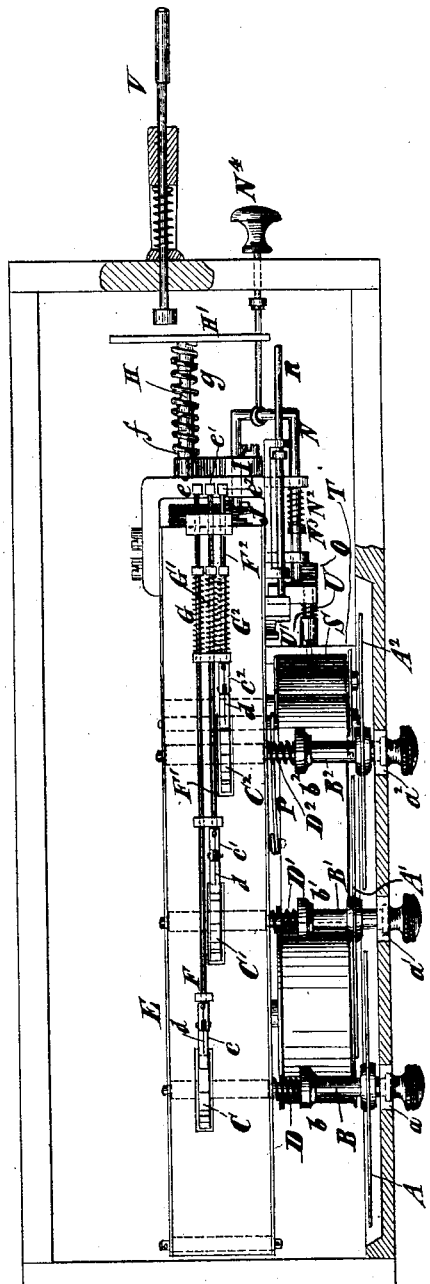
Witnesses
J. Keane
James R. Bowen
Inventors
Albert H. Dean
Stiles H. Whiting
By their atty
Edwin H. Brown (No Model.) 2 Sheets—Sheet 2.
A. H. DEAN & S. H. WHITING.
RECORDING INSTRUMENT FOR FIRE ALARM SIGNALS.
No. 268,876. Patented Dec. 12, 1882.
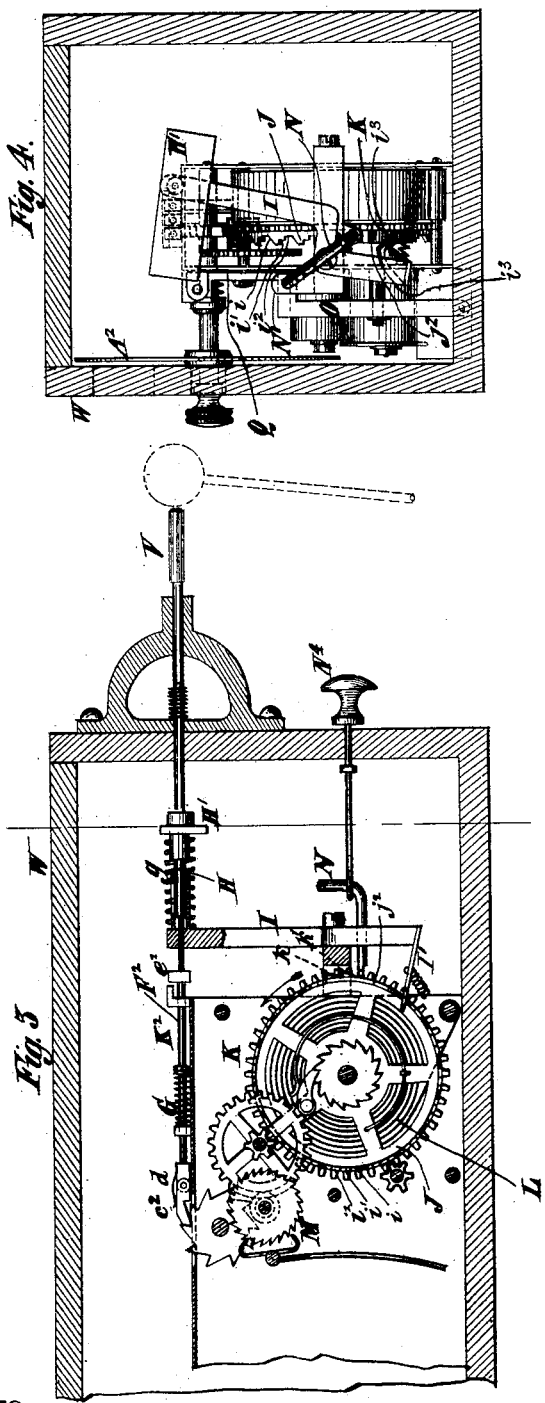
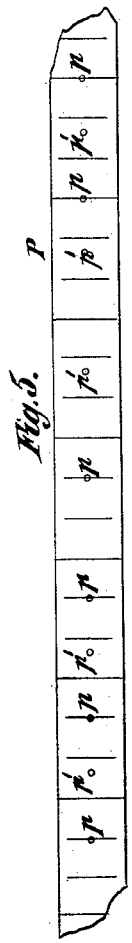

UNITED STATES PATENT OFFICE.

ALBERT H. DEAN AND STILES H. WHITING, OF BRIDGEPORT, CONNECTICUT.

RECORDING-INSTRUMENT FOR FIRE-ALARM SIGNALS.

SPECIFICATION forming part of Letters Patent No. 268,876, dated December 12, 1882.

Application filed May 10, 1882. (No model.)

*To all whom it may concern:*

Be it known that we, ALBERT H. DEAN and STILES H. WHITING, of Bridgeport, in the county of Fairfield, and the State of Connecticut, have invented a certain new and useful Improvement in Recording-Instruments, of which the following is a specification.

Our improvement is especially designed for recording fire-alarm signals sent to a fire-station, but it may wholly or partially be found applicable to other uses.

The nature of the improvement will be fully set forth, and pointed out in the claims.

In the accompanying drawings, Figure 1 is a side view of an instrument embodying our improvement with the side of the case removed. Fig. 2 is a plan thereof with the top of the case removed. Fig. 2* is a side view of a cam comprised in the instrument. Fig. 3 is a longitudinal section of one end portion of the instrument. Fig. 4 is an end view of the instrument with the end of the case removed, and Fig. 5 is a view of a piece of tape which is used in the instrument.

Similar letters of reference designate corresponding parts in all the figures.

A A' A² designate three dials, respectively, divided into ten spaces, one of which is marked with an arrow or cipher and the others of which are numbered from 1 to 9, inclusive. These dials operate in conjunction with holes $a\ a'\ a^2$ in the opposite side or front of the case W of the instrument to record the units, tens, and hundreds of numbers given as alarm-signals. These dials are mounted on rotary shafts B B' B², which are furnished with ratchet-wheels C C' C². Springs D D' D², applied to these shafts between collars $b\ b'\ b^2$, affixed thereto and the adjacent side of a box, E, in which the shafts are supported, exert sufficient friction to prevent the shafts from being turned accidentally. Any other suitable means may be employed for this purpose.

F F' F² are slider-bars, arranged, as here shown, in bearings affixed to the top of the box E, and adapted to slide lengthwise thereof. These bars are arranged side by side, and the ratchet-wheels C C' C² are arranged in line with them, so as to be operated by pawls $c\ c'\ c^2$, with which the inner ends of the rods are provided. The pawls are pivoted to the rods so as to rise and permit the passage of the teeth of the ratchet-wheels when the wheels are rotated independently of the pawls. Springs $d$ keep the pawls in position to operate on the teeth of the ratchet-wheels. Springs G G' G², acting between one of the bearings of the bars F F' F² and collars affixed to said bars, impel the bars outward—that is, away from the ratchet-wheels. On the outer end of the bars are heads $e\ e'\ e^2$, against which strikes a hammer, H, whereby the bars are moved inward. When the bars are impelled inward by the hammer H their pawls move the ratchet-wheels one tooth. The teeth of the ratchet-wheels correspond in number with the divisions of the dials. Hence on each movement of one of the ratchet-wheels one tooth the dial connected with that ratchet-wheel is shifted so as to display a new figure through its hole in the case W of the instrument.

The hammer H is supported by an arm, I, which, when the instrument is in operation, vibrates transversely to the length of the slider-bars F F' F², and carries the hammer opposite to the heads $e\ e'\ e^2$ of the slider-bars in succession, allowing it to dwell for an instant when opposite each. The hammer H is not rigidly connected to the bar I, but is supported in a bearing, $f$, so that it can be moved independently of the arm toward and from the slider-bars. A spring, $g$, surrounding the hammer between the arm I and a tail-piece, H', with which the hammer is provided, impels and holds the hammer away from the slider-bars when not otherwise actuated. When the instrument is at rest the arm I is in such position as to hold the hammer opposite the slider-bar F, which operates the dial A, whereby the first figure of a number of an alarm or signal is indicated. When the arm I vibrates it carries the hammer opposite the head $e'$ of the slider-bar F', and allows it to pause there for an instant. Then it carries the hammer opposite the head $e^2$ of the slider-bar F², and allows it to pause there for an instant. Subsequently it carries the hammer opposite the head $e$ of the slider-bar F, and after allowing it to pause there for an instant carries it on again, as just described.

The location of a fire is usually indicated by the strokes on a bell, and the strokes are repeated at the same preconcerted intervals—as, for instance, at intervals of three seconds apart, to indicate any single figure, as, for instance, 1, 2, 3, 4, 5, 6, 7, 8, 9. If there is a second figure in the number desired to be indicated, a longer lapse of time is allowed to occur—say, for instance, seven seconds—and then the strokes will be repeated at the same intervals as at first, in this instance at intervals of three seconds, until the second figure is indicated. Then if there is a third figure in the number sought to be indicated, a longer interval—say seven seconds—is again allowed to elapse, and thereafter the strokes are repeated at intervals of three seconds again until the third figure is indicated. The arm I is vibrated in accordance with these preconcerted intervals, and in this instance carries the hammer from opposite the head of one slider-bar to a position opposite the head of the next slider-bar each second, allowing it to dwell opposite the head of each slider-bar. From this explanation it will be readily seen upon reflection that at the end of each interval of three seconds the hammer will be opposite the same slider-bar as it was opposite at the beginning of the interval. It will also be obvious that at the end of an interval of seven seconds the hammer will be shifted to a position opposite the next slider-bar to that which it was opposite at the beginning of the interval. Hence, if struck every third second, it will act on the same slider-bar, but, if not struck for seven seconds, it will act on the next slider-bar in order of succession, and if struck subsequently every third second, it will act on the latter slider-bar repeatedly.

The tail-piece of the hammer H is intended to be struck by the clapper of an electro-magnetic bell, such as is commonly employed for sounding an alarm. Any other device operated by electro-magnetism or otherwise may be employed.

We will now describe the means whereby the arm I is vibrated.

J designates a rotary cam, here shown as of cylindric form and attached to a gear-wheel, K, forming one of a train of gear-wheels, which are operated by a spring, L, acting upon the said gear-wheel, and are controlled by an escapement, M. The gear-wheel K, its shaft $h$, and the spring L are combined in a well-known manner, so as to permit the winding of the spring by turning the shaft without imparting motion to the said gear-wheel. The cam J has a number of sets of step-like projections, $i$ $i'$, and faces or surfaces, $i^2$, as best shown in Fig. 2*; and the arm I has an extension, I', which bears against the cam. A spring, $l^2$, holds this extension of the arm I against the cam and vibrates the arm in one direction when permitted by the cam. By means of the cam and spring the vibratory motions of the arm above described are effected. The cam first vibrates the arm by means of one of the projections $i$ to the end of its throw in one direction, and holds it there for an instant by means of a surface which is of the same projection throughout. Then, as the cam rotates, the extension of the arm I passes on to a projection, $i'$, and the arm is thereby shifted a short part of its reverse throw and held there for an instant. Next the extension of the arm I comes in contact with a face or surface, $i^2$, and dwells there until the next projection $i$ of the cam acts upon it. The cam has also a continuous straight portion, $j^2$, coincident with the straight surfaces of the projections $i$. It also has a projection, $i^3$, extending from the surface $j^2$, and when this acts on the extension I' of the arm I the arm is vibrated so as to carry the hammer H beyond all of the slider-bars.

N designates a stop, consisting of a bar supported in a bearing, N', and adapted to engage with a projection, $k$, on the periphery of the cam J, adjacent to the surface $j^2$ thereof. A spring, $N^2$, applied to the bar N, between the bearing N' and a collar, $N^3$, affixed to the bar, holds the bar in contact with the periphery of the cam J and ready to engage with the projection $k$ and stop the cam. At the time this bar N engages with the projection $k$ of the cam the extension I' of the arm I bears against the projection $i^3$ of the cam. Hence when the cam is stopped by the bar N the instrument is rendered wholly inoperative, because the hammer has been carried and will be held beyond the slider-bars. To render the instrument operative the bar N has to be pulled out by means of the wire $N^4$ attached thereto, so as to disengage it from the projection $k$. The cam then rotates until a second projection, $k'$, on the periphery of the cam engages with it. When this occurs the projection $i^3$ has passed the extension I' of the arm I, and as the said extension then bears on the surface $j^2$ the hammer is brought opposite the head $e$ of the slider-bar F. The bar N, it will be observed, is of U-form. But one end bears on the cam J. The other end impinges against a lever, O, forming part of mechanism whereby a tape, P, is punched to make a record of the alarms given. This lever O is supported by a fulcrum, $l$, extending from the box E, and at the upper end is in contact with the lower end of a lever, Q, which is supported by a fulcrum, $m$ on the box E.

R designates a rod supported in bearings $n$, extending from the box E, and impinging against the upper end of the lever Q and the tail-piece H' of the hammer H. When, therefore, the tail-piece of the hammer is struck after the instrument is set in the manner just described, it forces the rod R forward, and by shifting the levers O Q forces the bar N out of engagement with the projection $k'$ of the cam J and releases the latter, besides causing the hammer H to strike the head $e$ of the slider-bar F. It will be well to remark here that when the hammer is carried beyond all the slider-bars by the action of the projection $i^3$ of the cam against the extension I' of the arm I, the tail-piece H' of the hammer is also carried out of the way of the rod R, so that if the tail-piece of the hammer should then be struck—as, for instance, through the repetition of an alarm—it will not only fail to cause the hammer to act on any of the slider-bars, but it will also fail to effect the release of the cam J.

We will now proceed to describe the mechanism which operates in conjunction with the tape P.

S S' are two rollers mounted on shafts which are supported by the box E, and serving to feed the tape P along. The shaft of the lower roller is driven from the train of gear-wheels before alluded to.

T designates a hollow anvil, through which the tape P is fed by the rollers S S'.

U designates a punch projecting into the hollow anvil T, and impelled outward by a spring, U', when not otherwise acted upon, so that it will not interfere with the feeding of the tape. A small weight may be attached to the lower end of the tape to insure its feeding properly. The lower end of the lever O extends into proximity with the punch U, and when said lever is actuated by a forward thrust of the rod R it drives the punch into the tape. It will therefore be seen that every time the tail-piece of the hammer is struck the hammer is caused to act on one of the slider-bars and the punch is caused to puncture the tape, which preferably is made of a strip of paper or other material capable of being easily punctured. As the rollers S S' will feed the tape with a practically uniform speed during the operation of the instrument, it is obvious that the paper will be punctured at regular distances, while the hammer is being struck at the same intervals of time, and that whenever the hammer is not struck until after a longer interval the tape will be punctured at a greater distance from the last puncture. Hence, according to the spaces between the punctures of the tape so will the tape indicate an alarm of a given number. Preferably the tape will, as shown, be marked at intervals corresponding to the distances which it will be fed between the strokes of the hammer, as such marking will facilitate determining the distances between the punctures of the tape. A permanent record of the signals given may be made by the use of this tape and the mechanism that operates in conjunction with it. This is not, however, the only advantage of the tape and the mechanism operating in conjunction with it. The dials A A' A$^2$ would be of little use if two different alarms were sent to a station at about the same time, for there would be but an unintelligible sounding of the alarm-bell, and of course a corresponding confusion in the operation of the said dials, due to this operation by the hammer of the alarm-bell. The tape will remedy this defect, as two sets of puncturings will be produced, due to the two alarms, as indicated in Fig. 5. The first alarm is indicated by the punctures $p$ upon the marks or lines of the tape, and indicate the alarm "23," while the second alarm is indicated by the punctures $p'$ between the lines and indicate the alarm "31." The tape when introduced into the instrument is set so that its first line or mark will be opposite the punch.

The bell-clapper does not operate directly on the hammer H, but on a rod, V, which extends through the case of the instrument.

We do not desire to be confined to operating the hammer H from the clapper of an electro-magnetic bell, as any other device having a similar movement may be employed.

It will be observed that the instrument, as shown, consists essentially of three slider bars for operating dials, a lever adapted to be vibrated so as to carry a hammer opposite the several slider-bars, and a cam actuated by a train of wheel-work serving to vibrate the lever; and it will be seen that when the hammer is impelled forward it will operate on the slider-bar opposite which it happened to be then located. Fire-alarms are given at regularly-recurring intervals, and at regularly-recurring intervals the cam acting on the lever carries the hammer opposite the same slider-bar, and therefore effects the operation of the same dial. When a longer pause occurs between the strokes of the hammer giving the alarm the hammer will be carried opposite a different slider-bar and a different dial will be operated. The punching of the tape is effected in unison with the operation of the slider-bars.

An example may conduce to a clearer understanding of invention. We will suppose that the instrument is in a state of rest, with the hammer H opposite the slider-bar F. The rod V, which operates upon the tail-piece H' of the hammer, extends into proximity with the clapper of an electro-magnetic bell, upon which is sounded the alarm indicative of the location of a fire. The clapper of the bell strikes not only on the bell, but also strikes and operates the rod V. We of course assume that the instrument is set ready to be started by a stroke upon the rod V. We will suppose that the alarm to be sounded is 372. At the first stroke of the hammer produced by the rod V the slider-bar F will be impelled forward, so as to rotate or turn the dial A far enough to exhibit its figure 1. The rod R is also operated from the tail-piece H' of the hammer, and, acting through the levers Q O and the bar N, releases the cam J. As soon as this occurs the cam J vibrates the lever I, first, so that it will carry the hammer H opposite the slider-bar F'; next, so that it will carry the hammer opposite the slider-bar F$^2$; subsequently, so that it will carry the hammer opposite the slide-bar F again, and so on. We will remark again that in striking an alarm three seconds are allowed to elapse between the strokes of the bell which indicate the hundreds figures, and seven seconds between the strokes of the bell which indicate the hundreds figures and the strokes which indicate the tens figures, three seconds between the strokes which indicate the tens figures and seven seconds between strokes which indicate the tens figures and the strokes which indicate the units figures, and three seconds between the strokes which indicate the units figures. The effect of this first stroke has been explained. The clapper of the bell does not impel the hammer forward again until three seconds have expired. The cam J vibrates the lever I and the hammer back to the slider-bar F at the end of every three seconds. Therefore when the clapper of the bell makes its second stroke, it causes the hammer H to again operate the slider-bar F and the dial A is thereby impelled forward so that its figure 2 will be exhibited. On the third stroke of the clapper of the bell the hammer H is again opposite the slider-bar F, and is therefore caused to actuate that slider-bar again to cause the figure 3 of the dial A to be exhibited. The pause of seven seconds now occurs. As the hammer H is carried at the expiration of every third second opposite the same slider-bar, it is obvious that upon the expiration of seven seconds it will have been brought opposite the slider-bar F twice since the last stroke—namely, once at the end of the third second, and again at the end of the sixth second—and at the end of the seventh second it will have been carried opposite the slider-bar F'. Now the strokes of the bell commence again and are repeated at intervals of three seconds, causing the slider-bar F' to be operated by the hammer at the end of every third second. At the end of the seventh stroke the figure 7 of the dial A' will be exhibited. A pause of seven seconds between the strokes of the bell-clapper again occurs, and during such pause the hammer is carried twice opposite the slider-bar F'—namely, at the end of the third and sixth seconds—and at the end of the seventh second is brought opposite the slider-bar $F^2$. The stroke of the bell-clapper which then occurs causes the hammer to act upon the slider-bar $F^2$, and thereby causes the dial $A^2$ to exhibit its figure 1. The strokes of the bell-clapper are repeated at pauses of three seconds, at which times the hammer is successively brought opposite the slider-bar $F^2$. At the second stroke of the bell-clapper the dial $A^2$ is caused to exhibit its figure 2. The dials A A $A^2$ then indicate together the alarm 372.

We do not think it necessary to again describe the operation of punching the tape.

After the alarm is finished the cam J continues to vibrate the lever I back and forth until the cam is stopped in the manner heretofore described. This vibration of the lever, of course, has no effect on the instrument except when the clapper of the bell impels the hammer against the slider-bars.

What we claim as our invention, and desire to secure by Letters Patent, is—

1. In a recording-instrument, the combination of two or more dials, means for rotating them independently of each other, and a hammer supported on an arm which is vibrated to adjust the hammer properly to operate different dials, substantially as specified.

2. In a recording-instrument, the combination of a dial, means for rotating the same, a hammer for operating these means, and a device whereby the hammer is rendered inoperative after an alarm is given until the instrument is reset, substantially as specified.

3. In a recording-instrument, the combination of the dials A A' $A^2$, ratchet-wheels C C' $C^2$, slider-bars F F' $F^2$, the hammer H, and the vibrating arm I, carrying the hammer and presenting it to the slider-bars, substantially as specified.

4. In a recording-instrument, the combination of the dials A A' $A^2$, means for operating the same, the hammer H, the arm I, and the cam J, substantially as specified.

5. In a recording-instrument, the combination of the dials A A' $A^2$, means for operating the same, the hammer H, arm I, cam J, and a train of gear-wheels connected with the said cam, substantially as specified.

6. In a recording-instrument, the combination of the dials A A' $A^2$, means for operating the same, the hammer H, arm I, cam J, with its projection $k$, and the stop N, substantially as specified.

7. In a recording-instrument, the combination of the dials A A' $A^2$, means for operating the same, the hammer H, arm I, and cam J, with its projections $i^3$ and $k$, substantially as specified.

8. In a recording-instrument, the combination of the dials A A' $A^2$, means for operating the same, the hammer H, arm I, and cam J, with its projections $k$, $i^3$, and $k'$, substantially as specified.

9. In a recording-instrument, the combination of a tape, the punch U, the rod R, means for transmitting the motions of the rod to the punch, the vibrating arm I, and the piece H', substantially as specified.

10. In a recording-instrument, the combination of a tape, the punch U, the rod R, means for transmitting the motions of the rod to the punch, the arm I, the cam J, having a projection, $i^2$, and the piece H', substantially as specified.

11. In a recording-instrument, the combination of a tape, the punch U, the rod R, means for transmitting the motions of the rod to the punch, the arm I, the cam J, having projections $i^2$ and $k$, the stop N, and the piece H', substantially as specified.

12. In a recording-instrument, the combination of the rollers S S', the punch U, the rod R, the levers O Q, and the arm I, substantially as specified.

13. In a recording instrument, the combination of the dials A A' $A^2$, means for rotating them, the arm I, hammer H, with its tail-piece H', the rod R, the levers O Q, the train of gear-wheels, the cam J, and the bar N, substantially as specified.

14. In a recording-instrument, the combination of a tape, the rollers S S', the train of wheels, the bar N, the levers O Q, and the punch U, substantially as specified.

ALBERT H. DEAN.

Witnesses: STILES H. WHITING.
H. E. BOWSER,
W. D. LIMBURGH, Jr.